United States Patent [19]

Otsuka

[11] Patent Number: 5,140,589
[45] Date of Patent: Aug. 18, 1992

[54] BATTERY SAVING SYSTEM FOR INTERRUPTING POWER SUPPLIES AT INTERVALS VARIABLE WITH TRAFFIC PATTERN

[75] Inventor: Shigeru Otsuka, Tokyo, Japan
[73] Assignee: NEC Corporation, Tokyo, Japan
[21] Appl. No.: 606,999
[22] Filed: Oct. 31, 1990

[30] Foreign Application Priority Data

Nov. 1, 1989 [JP] Japan ............................ 1-285937

[51] Int. Cl.⁵ ............................................ H04J 3/16
[52] U.S. Cl. ............................ 370/95.1; 455/231; 455/9
[58] Field of Search .............. 370/95.1, 95.3, 26, 370/106, 77; 455/9, 255, 231, 343, 3; 379/58

[56] References Cited

U.S. PATENT DOCUMENTS

| 4,577,315 | 3/1986 | Otsuka | 370/95.3 |
|---|---|---|---|
| 4,713,809 | 12/1987 | Miyota | 370/26 |
| 4,794,649 | 12/1988 | Fujiwara | 455/9 |
| 4,804,954 | 2/1989 | Macnak et al. | 370/106 |
| 4,860,005 | 8/1989 | DeLuca et al. | 455/231 |
| 4,978,944 | 12/1990 | Andros et al. | 455/255 |

Primary Examiner—Douglas W. Olms
Assistant Examiner—T. Samuel
Attorney, Agent, or Firm—Sughrue, Mion, Zinn, Macpeak & Seas

[57] ABSTRACT

In a communications system, a base station has a memory for storing interval control values representative of time-varying traffic pattern of the communications system. A time-keeping circuit recalls a stored interval control value from the memory according to different time of day and a battery-saving command signal is sent from the base station at variable intervals as a function of the value recalled from the memory. Power supplies of a remote station are interrupted for a constant brief interval in response to the battery-saving signal, so that the remote station is powered for a shorter interval during a light traffic period and for a longer interval during a heavy traffic period. In a preferred embodiment, traffic data is automatically collected from the communications system and the stored interval control values are updated according to the collected traffic data.

9 Claims, 5 Drawing Sheets

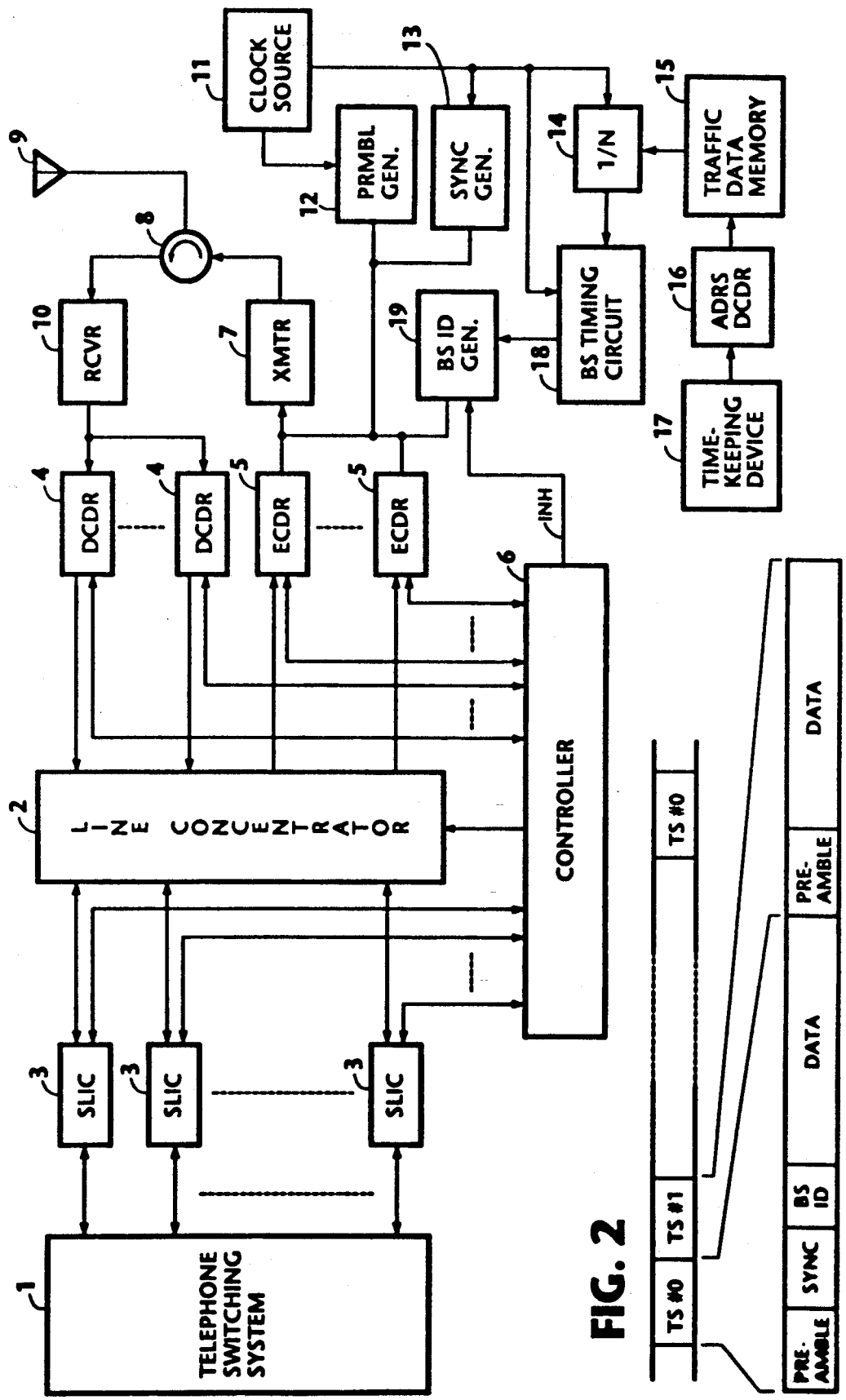

| | 0-1 | 1-2 | 2-3 | 3-4 | 4-5 | 5-6 | ... | 22-23 | 23-24 |
|---|---|---|---|---|---|---|---|---|---|
| SUNDAY | | | | | | | | | |
| MONDAY | | | | | | | | | |
| TUESDAY | | | | | | | | | |
| WEDNESDAY | | | | | | | | | |
| THURSDY | | | | | | | | | |
| FRIDAY | | | | | | | | | |
| SATURDAY | | | | | | | | | |

WEEKLY TRAFFIC DATA

MONTHLY TRAFFIC DATA

BATTERY SAVING SYSTEM FOR INTERRUPTING POWER SUPPLIES AT INTERVALS VARIABLE WITH TRAFFIC PATTERN

BACKGROUND OF THE INVENTION

The present invention relates generally to communications systems, and more specifically to a battery saving system for a battery-powered communications system such as TDM (time division multiplex) radio communications system connected to a public or private switched telephone network.

A battery-powered communications system such as TDM radio communications system is known in the art of telephone switching as a means for connecting remotely located telephone subscribers to the public switched telephone network. The system includes a base station connected to the network and remote terminal stations to which subscriber telephones are connected. Depending on the distances between the base station and terminal stations, one or more regenerative repeater stations are located for relaying signals. Because of the scarsity of electric energy source, both repeater and terminal stations use a solar battery for charging a storage battery for operation. Synchronized battery saving techniques have evolved from this background by periodically interrupting the power supplies of the repeater stations in response to a battery-saving command signal sent at constant intervals from the base station during a standby mode. This signal is relayed from one repeater station to the next or to the terminal stations to synchronously cut off the power-drain units of the repeater and terminal stations. As described in U.S. Pat. No. 4,577,315, issued to S. Otsuka, battery saving operation is usually continued even if a call request occurs in a standby mode by exchanging call-setup signals during available time intervals. In addition, from the power savings viewpoint, it is desirable to increase the ratio of power-off to power-on times. However, if the ratio is too high, the available time intervals for exchanging call-setup signals are not sufficient for handling simultaneous calls, and hence contention is likely to occur between call requests, resulting in a queue, or long time to establish a connection.

SUMMARY OF THE INVENTION

It is therefore an object of the present invention to provide a battery saving system capable of reducing the likelihood of contention between simultaneous calls without losing the merit of battery saving.

The above object is obtained by varying the interval between successive battery-saving command signals in accordance with the traffic pattern of a communications system since occurrences of call requests depend largely on different times of day as well as on different days of week.

According to the battery saving system of this invention, the base station of a communication system has a memory for storing interval control values representative of a traffic pattern of the communications system. A battery-saving signal is sent from the base station at variable intervals as a function of the stored values. Power supplies of a remote station are interrupted in response to the battery-saving signal, so that the remote station is powered for a shorter interval during a light traffic period and for a longer interval during a heavy traffic period.

Specifically, the base station includes a time-keeping circuit for reading a stored interval control value from the memory according to different time of day. The frequency of a frame clock signal is divided in accordance with the recalled value and the battery-saving command signal is generated at a rate determined by the divided clock signal.

In a preferred embodiment, a traffic data collecting circuit is provided for collecting traffic data from the communications system and generating a table which is divided into columns according to different times of day and rows according to different days of week so that a plurality of cells are defined. Collected traffic data are stored into the cells of the table in accordance with the time of day and the day of week at which the data is collected. The stored data is constantly updated with subsequently collected traffic data, and the interval control values are derived from the updated traffic data.

BRIEF DESCRIPTION OF THE DRAWINGS

The present invention will be described in further detail with reference to the accompanying drawings, in which:

FIG. 1 shows in block diagram from a radio concentrator base station according to the present invention;

FIG. 2 shows a frame structure of signals transmitted from the base station;

DETAILED DESCRIPTION

Figure 3:
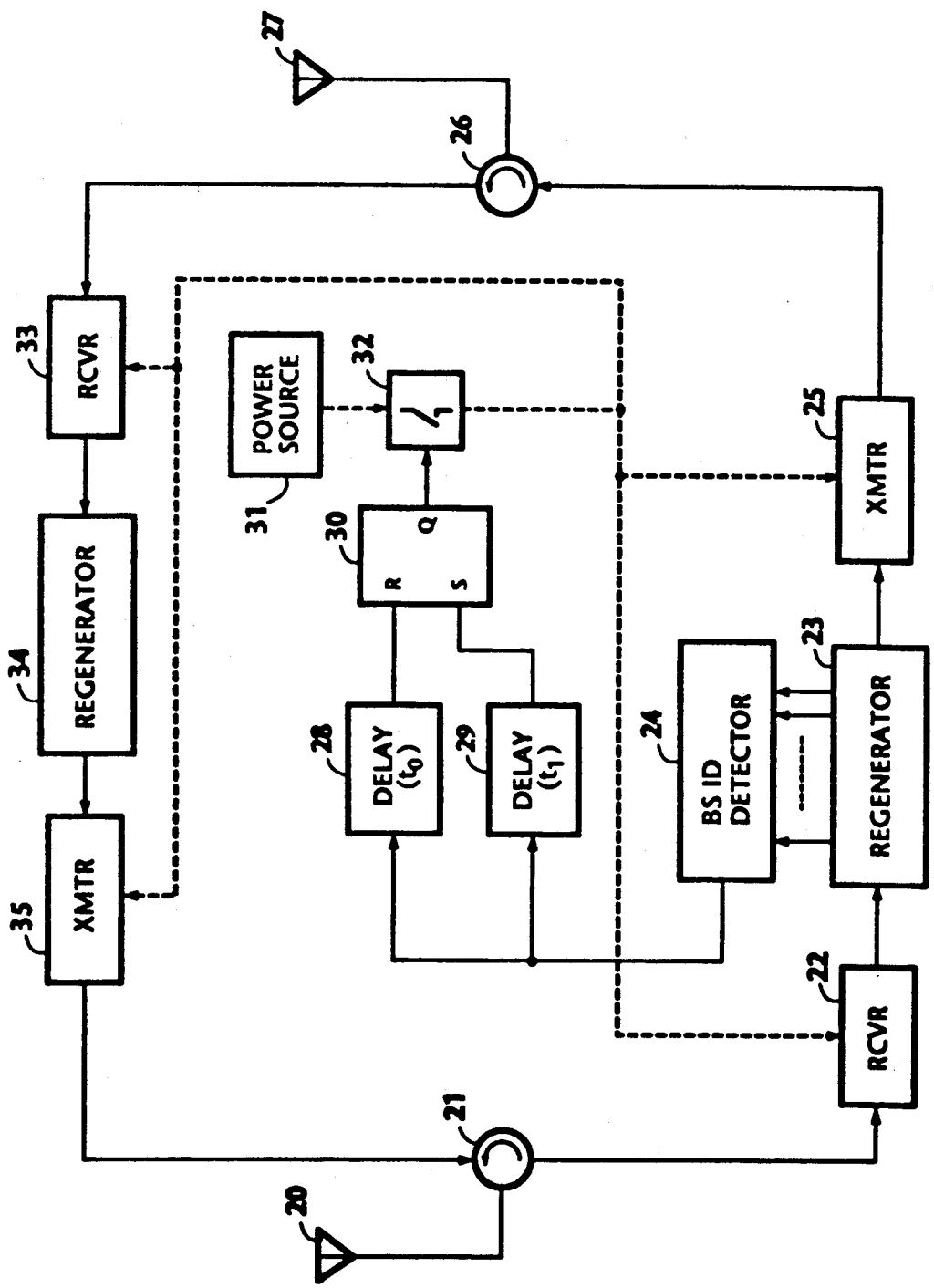
FIG. 3 shows details of a repeater station.

Referring now to FIG. 1, there is shown the base station of a time division multiplex (TDM) radio concentration system according to the present invention. The base station is connected to a telephone switching system 1 of the public or a private telephone network and establishes TDM radio channels through one or more repeater stations with a plurality of terminal stations to which user stations are respectively connected. The base station is made up of a line concentrator 2 having four-wire line terminals coupled through subscriber interface circuits 3 to corresponding two-wire line terminals of the telephone switching system 1 and two-wire trunk terminals coupled respectively to decoders 4 and encoders 5. Each subscriber line interface circuit 3 has a hybrid with the transmit and receive portions of its four-wire circuit being connected to the associated four-wire line terminal of the line concentrator 2 and its two-wire circuit being connected to the associated line terminal of the telephone switching network 1. Line concentrator 2 provides concentration of lines to a fewer number of trunks (decoders and encoders) as viewed from the line side of the concentrator and deconcentration of trunks to a larger number of lines as viewed from the trunk side of the concentrator.

Base station has a controller 6 which is associated with the subscriber line interface circuits 3, decoders 4 and encoders 5. For full-deplex operation, controller 6 controls line concentrator 2 to establish therein an outgoing connection between the transmit branch of a four-wire line terminal and a selected encoder 5 and an incoming connection between the receive branch of the four-wire line terminal and a selected decoder 4 in a manner well known in the telephone switching art.

The outputs of encoders 5 are coupled to a transmitter 7 in which outgoing digital signals from the encoders are multiplexed, modulated upon a carrier and transmitted from antenna 9 by way of a duplexer 8. Incoming signal from the associated repeater station is detected by antenna 9 and coupled through duplexer 8 to a receiver 10 in which it is demodulated and demultiplexed into individual channels for respective coupling to decoders 4. As shown in FIG. 2, the signal transmitted from the base station is in the format of a frame each containing a sequence time slots, or channels. Time slot #0 contains a preamble, a frame sync code, a battery saving identifier field and a data field which carries the output signals of encoders 5.

To achieve this frame format, a clock source 11 drives a preamble generator 12 to cause it to generate a preamble in response to a time-slot clock pulse and it further drives a sync generator 13 to generate a sync code in response to a frame clock pulse which occurs at 4-millisecond intervals, for example. The outputs of preamble and sync generators 12 and 13 are coupled to transmitter 7 in which they are multiplexed with data signals to form a frame signal. A divide-by-N frequency divider 14 is also driven by clock source 11 to divide the frequency of frame clock pulses by a factor which is varied as a function of the output of a traffic data memory 15 in which statistical traffic data is manually collected and translated into corresponding frequency dividing factors. The latter is stored into a table which is divided into columns according to times of day and rows according to days of week. The table is stored in memory 15 and addressed at periodic intervals by an address decoder 17 in which time-of-day and day-of-week signals are supplied from a time-keeping circuit 17 and translated into an address signal to access a corresponding frequency dividing factor. Therefore, the statistically obtained dividing factors in memory 15 reflect a varying traffic load of the system. The frame clock frequency is thus divided by frequency divider 14 with a small value of dividing factor N during light traffic periods and with a large value of N during heavy traffic periods. In this way, the power supplies of the main units of repeater stations and those of terminal stations are interrupted more frequently during light traffic periods than during heavy traffic periods.

The output of frequency divider 14 is applied to a battery saving (BS) timing circuit 18 to which the frame clock pulses are also supplied from clock source 11. In response to the leading edge of each output pulse from frequency divider 14, BS timing circuit 18 generates a pulse with a duration equal to the interval between successive sync codes. The output of BS timing circuit 18 is fed to a battery saving (BS) identifier generator 19, which supplies a BS identifier to transmitter 7 so that two BS identifiers are generated in succession in response to a single output pulse from the frequency divider 14. The repeated transmission of BS identifiers is to ensure reception of the signal. Each of the generated BS identifier is inserted into the BS ID field of time slot #0 of two successive frames. BS ID generator 19 is active during a standby mode of the communications system and is inhibited when a control signal is supplied from controller 6 when a connection is established in the line concentrator 2 following the occurrence of a call request during the standby mode.

Details of a repeater station are shown in FIG. 3. Signals from the base station are received by an antenna 20 and passed by way of duplexer 21 to a receiver 22 in which the signals are demodulated into the baseband signal which is then fed to a regenerator 23 for amplification and regeneration of original pulses. Regenerator 23 includes a shift register along which the regenerated pulses are shifted. The individual stages of the shift register are coupled to a battery-saving identifier detector 24 to detect the identifier inserted to each BS ID field of the incoming signal. The output of the regenerator is coupled to a transmitter 25 in which it is modulated on a carrier and transmitted from antenna 27 by way of duplexer 26 to terminal stations. Signals from the terminal stations are detected by antenna 27 and demodulated by a receiver 33 into original pulses which are fed to a regenerator 34 for amplification and regeneration of original pulses, which are modulated by a transmitter 35 and transmitted to the base station from antenna 20.

Meanwhile, the battery-saving identifier detector 24 generates an output pulse upon detection of a BS identifier and supplies it to delay circuits 28 and 29 for delaying it for intervals $t_0$ and $t_1$, respectively. The outputs of delay circuits 28 and 29 are respectively coupled to the reset and set inputs of a flip-flop 30 whose output is in turn connected to a power switch 32 which closes its contacts when the Q output of flip-flop 30 is high. Power voltage is supplied from a power source, or storage battery 31 through switch 32 to the power drain units of the repeater station including the receivers 22, 33 and transmitters 25 and 35.

Figure 4:
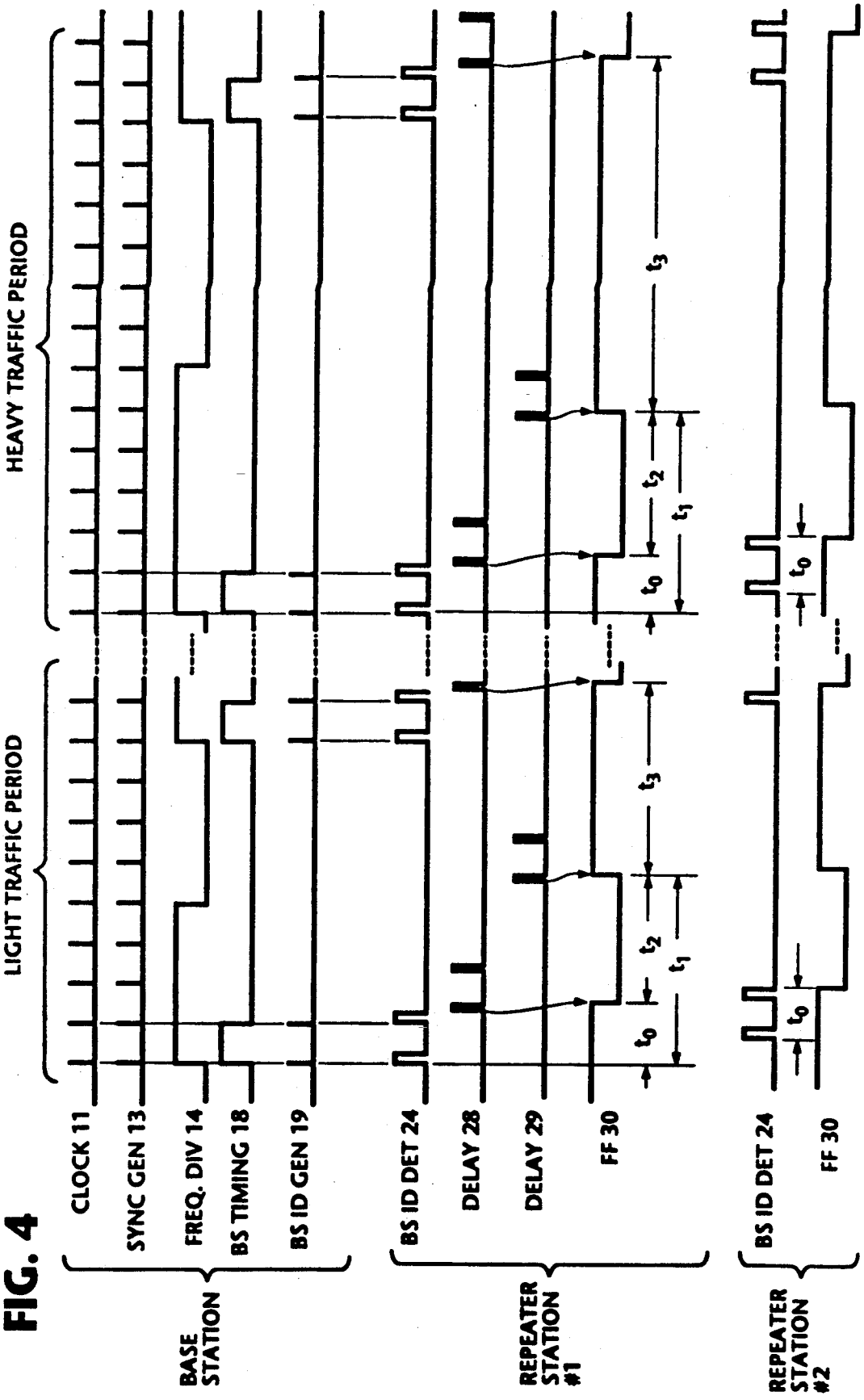
FIG. 4 shows a timing diagram for a full understanding of the present invention.

The operation of the system will be given below with reference to a timing diagram shown in FIG. 4, assuming that two repeater stations #1 and #2 are provided. In the base station, frame sync codes are generated in synchronism with the frame clock pulse. Traffic data stored in memory 15 is read out periodically and supplied to frequency divider 14. During light traffic periods, relatively low values of dividing factor N are supplied to the frequency divider so that it generates a pulse 14a of relatively short duration, and during heavy traffic periods, relatively high values of dividing factor N are supplied to the frequency divider and a pulse 14b of relatively long duration is generated. A battery-saving timing circuit 17 generates a pulse of a duration corresponding to the clock interval in response to the leading edge of each output pulse from frequency divider 14. Battery-saving identifier generator 18 generates a battery-saving command signal, or identifier (BS ID) in response to each of the leading and trailing edges of the BS timing pulse.

In the #1 repeater station, flip-flop 30 is normally in a set condition, producing a high Q output so that switch 32 is turned on to energize all the power drain units of the repeater station. On detecting a BS identifier from the signal received from the base station, the BS ID detector 24 of the repeater station generates an output signal which is delayed for an interval $t_0$ by delay circuit 28. During this interval $t_0$, the transmitter 25 of the repeater station is allowed to relay two BS ID signals in succession to the next repeater station or terminal stations. Upon termination of this interval, the output of the delay circuit 28 is supplied to the reset input of flip-flop 30, causing switch 32 to be turned off. The repeater station thus enters a battery saving mode. The output of BS ID detector 24 is also delayed for an interval $t_1$ by delay circuit 29. At the end of this interval, flip-flop 30 is set, causing switch 32 to be turned on again, terminating the battery saving mode. Thus, the repeater station is in a battery saving mode for an interval $t_2 (= t_1 - t_0)$ and in a normal mode for an interval $t_3$. Since $t_1$ is constant, active interval $t_3$ varies proportionally to the amount of traffic. Although two output pulses are generated in succession by BS identifier detector 24 if BS identifiers are properly received from the base station, flip-flop 30 responds only to the outputs of delay circuits 28, 29 of the first occurrences.

In the #2 repeater station, the BS identifier is detected during a period following the interval $t_0$ provided by the #1 repeater station. In a similar manner, the delay circuit 28 of repeater station #2 introduces a delay time $t_0$ before relaying the BS identifier to the terminal stations in order to allow them to receive it.

As described in aforesaid U.S. Pat. No. 4,577,315, the terminal stations consist of circuitry similar to the repeater stations to effect battery saving in response to reception of a BS identifier from the repeater station. In this way, the whole system is synchronized to save the consumption of power of the repeater and terminal stations which would otherwise be dissipated.

Since the traffic pattern of telecommunications systems varies statically with both short and long terms and dynamically with various factors such as social, economic and environmental changes. The latter factors are unexpected and cannot automatically be reflected in the traffic data memory 15 of the embodiment of FIG. 1. In addition, the time-keeping circuit 17 tends to produce an error with the passage of time from the standard time, and thus needs correction at intervals. A second embodiment shown in FIG. 5 is to automatically update the contents of traffic data memory 15 by constantly recording calls carried by the system during different times of day and different days of week, and summing totals of corresponding items to produce a monthly traffic pattern, using the same time-keeping circuit which drives the address decoder 16.

Figure 5:
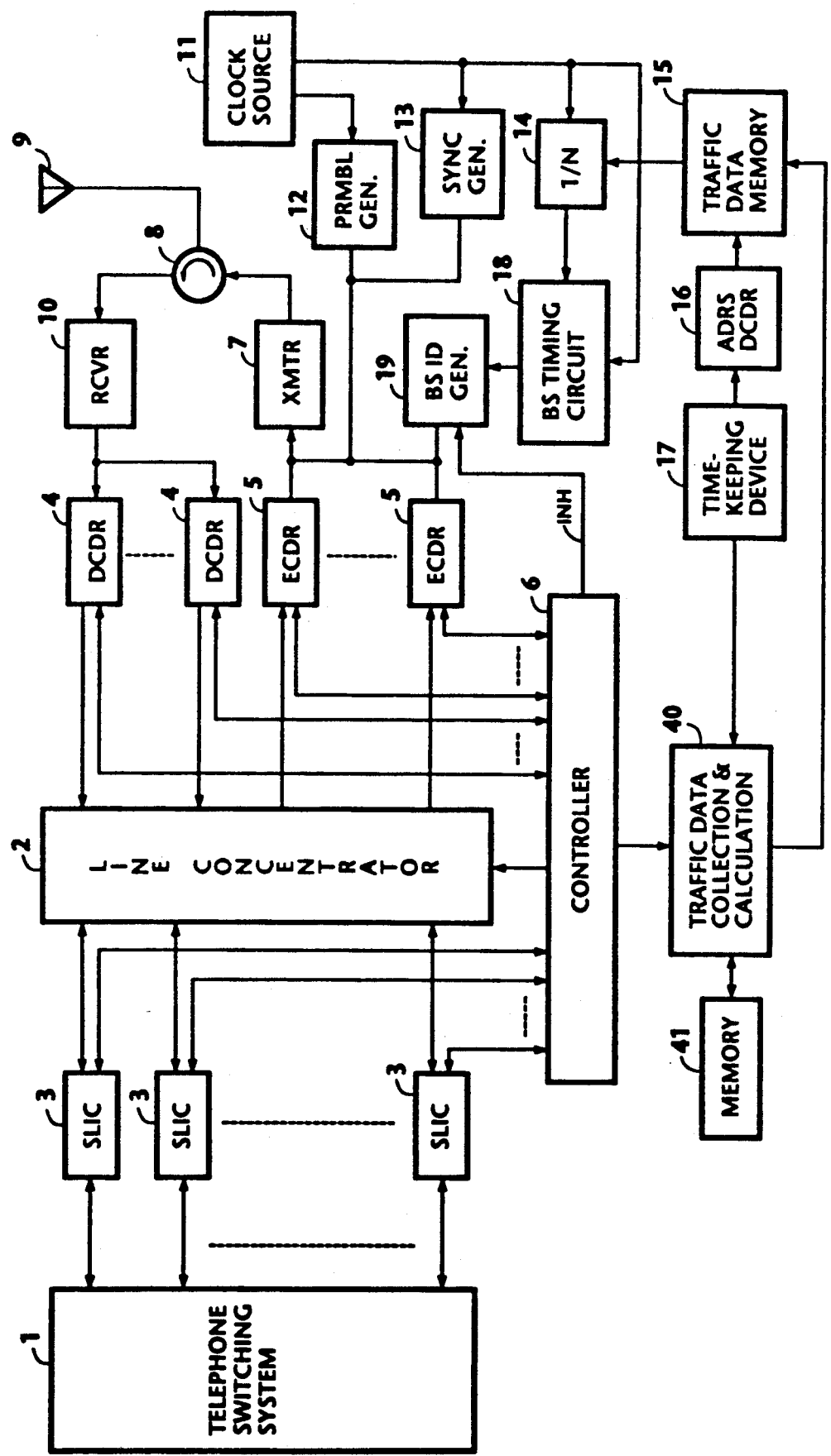
FIG. 5 shows in block diagram form a second embodiment of the present invention.

The embodiment of FIG. 5 includes a traffic data collection and calculation circuit 40. In the illustrated embodiment, circuit 40 is shown as a separate unit though it may be included in controller 6. Data collection and calculation circuit 40 is constantly receiving the time-keeping signal from time-keeping circuit 17 and detects incoming and outgoing calls and knows the time of detection of such calls. Specifically, when an incoming call is received from the telephone switching system 1, a ringing signal is received by a subscriber line interface circuit 3, which is communicated to controller 6 for establishing a connection in the line concentrator 2 and to the data collection and calculation circuit 40 as well. If an outgoing call is received from a terminal station, an originating-call signal is received by a decoder 4 and communicated to controller 6 for establishing a connection in the line concentrator 2 and to the circuit 40.

Figures 6A, 6B:
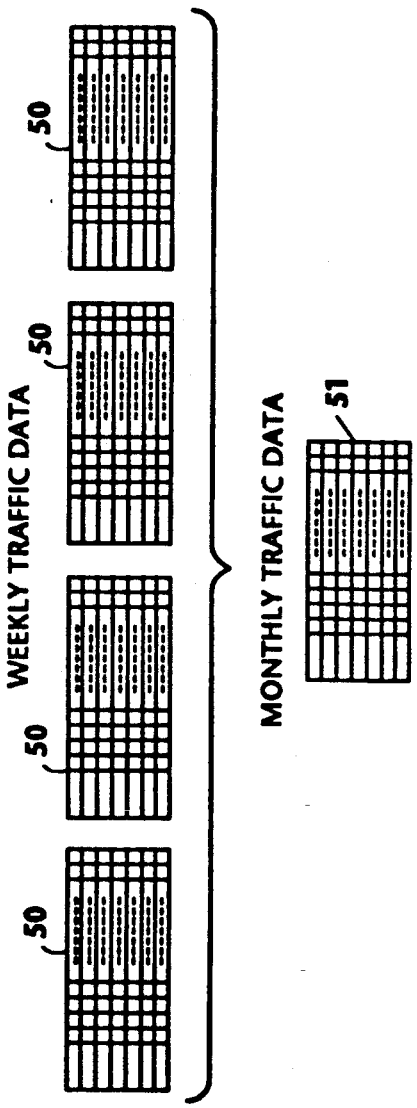
FIGS. 6A and 6B show contents of the memory of FIG. 5.

The number of detected calls is then stored into a cell of a weekly table 50 which is defined in a memory 41 as shown in FIG. 6A. The weekly table is divided into columns according to twenty-four hours of day and rows according to days of week, defining cells in which the number of detected calls is stored according to the time indicated by the time-keeping signal and updated as a new call is detected. At the start of each week, a new weekly table is created. At the end of each month, the numbers given in corresponding cells of all weekly tables are averaged by circuit 40 and stored into corresponding cells of a monthly table 51 (FIG. 6B) which is identical in format to the weekly table 50. The numbers given in the monthly table 51 are translated by circuit 40 into corresponding frequency dividing factors and stored into traffic data memory 15. In this way, the weekly traffic patterns are reflected in the monthly traffic pattern to be used in the next month. Because of the use of the same time-keeping circuit 17 for collecting traffic data, the error in the time-keeping circuit 17 is automatically compensated.

The foregoing description shows only one preferred embodiment of the present invention. For example, the traffic data could equally be as well represented by the products of the number of calls and their respective holding times (expressed in Erlang). While two BS identifiers are transmitted in succession to increase the probability of their reception, transmission of only one BS identifier for each output pulse from frequency divider 14 may be sufficient for applications where the transmission system has a high signal to noise ratio. Other modifications are apparent to those skilled in the art without departing from the scope of the present invention which is only limited by the appended claims.

What is claimed is:

1. A battery saving system for a communications system having a base station and a remote station, comprising:

first means in said base station for storing traffic pattern data representative of a traffic volume of said communications system during every hour of a day;

a time-keeping circuit for generating a time-of-day signal;

second means in said base station for reading said traffic pattern data from said first means in response to said time-of-day signal and transmitting a battery-saving signal to the remote station at intervals which are variable as a function of said traffic volume of the read traffic pattern data; and third means in said remote station for interrupting power of the remote station in response to said battery-saving signal, so that said remote station is powered for a shorter interval during a light traffic period and for a longer interval during a heavy traffic period.

2. A battery saving system as claimed in claim 1, wherein said second means includes a frequency divider for dividing a clock signal in frequency in accordance with said stored traffic volume of the read data and causing said battery-saving signal to be generated at a rate determined by the divided clock signal.

3. A battery saving system as claimed in claim 1, wherein said time-keeping circuit further generates a day-of-week signal for reading said values corresponding to different days of week, and wherein said frequency divider divides said clock signal in frequency in accordance with said time-of-day signal and said day-of-week signal.

4. A battery saving system as claimed in claim 1, further comprising means for collecting traffic data from said communications system and deriving said values from the collected traffic data.

5. A battery saving system as claimed in claim 3, further comprising means for collecting traffic data from said communications system and deriving said values from the collected traffic data, wherein said data collecting means generates a table which is divided into columns according to different times of day and rows according to different days of week so that a plurality of cells are defined, stores said values respectively into said cells in accordance with said time-of-day signal and said day-of-week signal, and constantly updates the stored values with values derived from subsequently collected traffic data.

6. A battery saving system as claimed in claim 5, wherein said data collecting means generates said table for each of different weeks of a month and averages the values stored in corresponding cells of the tables and stores the averaged values into a monthly table configured identically to said tables.

7. A battery saving system as claimed in claim 1, wherein said communications system is a time-division multiplex system, and wherein said battery-saving signal is inserted into a specified time slot of a time-division multiplexed signal of said communications system.

8. A method of saving power supplies of a communications system, comprising:
 a) storing traffic pattern data representative of a traffic volume of said communications system during every hour of a day in a memory;
 b) generating a time-of-day signal representing a time of day;
 c) recalling the stored traffic pattern data from said memory in response to said time-of-day signal and transmitting a battery-saving signal from a base station to a remote station at intervals variable as a function of the traffic volume of said recalled traffic pattern data; and
 d) interrupting power supplies of the remote station in response to said battery saving signal, so that said remote station is powered for a shorter interval during a light traffic period and for a longer interval during a heavy traffic period.

9. A method as claimed in claim 8, wherein the step (a) comprises:
 a1) collecting traffic data from said communications system and detecting time and day at which said data is collected;
 a2) storing the collected data into a location of a weekly table specified according to the detected time and day;
 a3) repeating the steps (a1) and (a2) to produce a plurality of weekly tables;
 a4) averaging corresponding data in said weekly tables and producing a monthly table; and
 a5) deriving said stored values from the monthly table, and repeating the steps (a1) to (a4).

* * * * *